United States Patent Office 2,836,489
Patented May 27, 1958

2,836,489

METHOD OF PRODUCING STEEL

Georg Henke, Dortmund, Germany, assignor to Westfalenhütte Aktiengesellschaft, Dortmund, Germany, a firm No Drawing. Application January 25, 1955
Serial No. 484,058

Claims priority, application Germany January 26, 1954

10 Claims. (Cl. 75—58)

The present invention relates to a method of producing steel and more particularly to the deoxidation of steel during the production thereof by treatment in an open hearth furnace, a converter or the ladle.

The pre-deoxidation of molten steel in the open hearth furnace and the converter as well as in the ladle by contact of the molten steel with spiegeleisen, ferromanganese, aluminized steel iron and the like is well known. All of these additives result in a lowering of the oxygen content of the steel whereby the deoxidation products produced are in liquid or solid form. This has the disadvantage that the bath as a result of the solid or liquid deoxidation products remains too passive so that at least in the surface layer of the bath oxygen enters the molten metal from the slag and the purpose of the pre-deoxidation is not completely achieved.

Attempts have been made to recarburize the bath by the addition of carbon thereto in order to obtain gaseous deoxidation products. It has also been attempted to blow gases of various types through the bath. However, neither of these processes has been successful in practice. These methods have been particularly unsuccessful in the production of steel in accordance with the Martins process since the blowing through of gases in such process is extremely involved.

It is an object of the present invention to provide a method of deoxidizing steel whereby the above enumerated disadvantages of the known processes are avoided.

It is a further object of the present invention to provide a method of deoxidizing steel whereby mainly gaseous deoxidation products are produced which result in a turbulence of the bath and thereby a homogeneous deoxidation thereof.

It is still a further object of the present invention to provide a method of deoxidizing steel with a de-siliconized pig iron or steel iron.

It is yet another object of the present invention to provide a method of producing de-siliconized pig iron or steel iron for use in the deoxidation of steel.

Other objects and advantages of the present invention will be apparent from a further reading of the specification and of the appended claims.

With the above objects in view, the present invention mainly consists in a method of producing steel, the deoxidation of the steel comprising the step of contacting molten steel containing oxygen with a pig iron containing carbon and being substantially silicon-free, whereby the molten steel is deoxidized by reaction of the oxygen contained therein with the carbon of the pig iron producing gas which agitates the mixture and thereby results in rapid and homogeneous deoxidation of the steel.

The term "pig iron" as used throughout the specification and claims referring to the de-siliconized pig iron which is used for the deoxidation of the steel in accordance with the present invention is meant to include steel iron, spiegeleisen, ferromanganese and the like substances which however have been de-siliconized prior to use of the "pig iron" for the deoxidation of the steel.

The de-siliconized pig iron may be added to the molten steel to be deoxidized in either solid or liquid form. In either case a very lively boiling occurs spontaneously with a simultaneous lowering of the oxygen content of the molten steel due to the production of CO which is a gas and which bubbles through and agitates the bath. Preferably the silicon-free pig iron is added to the molten steel in the open hearth furnace in solid condition since the high carbon concentration in the pig iron and the oxygen contained in the molten steel results in a lively reaction as long as the solid pig iron is present.

The use of pig iron which still contains silicon to deoxidize molten steel does not have the beneficial results of the present invention because the silicon of the pig iron would first combine with the iron oxide in the steel which would bring the agitated boiling movement to a standstill. The boiling again starts when the silicon has been used up from the pig iron. However, in the meantime the carbon has been taken up by the steel and the boiling is much slower and less active than by the use of silicone-free pig iron in accordance with the present invention. Moreover, when silicon-containing pig iron is utilized, there is an undesirable lengthening in time of the smelting process.

The following explanation of the beneficial results obtained according to the present invention is given in the hope that it will help explain the invention, the scope of the invention not however being limited thereto.

There are several stronger deoxidizing agents than carbon, for example aluminum, silicon and manganese. However, each of these substances when oxidized results in a solid product as shown by the following equation:

$$4Al + 2O_2 = 2Al_2O_3$$

$$Si + O_2 = SiO_2$$

$$Mn + O = MnO$$

These deoxidation products are very difficult to separate from the molten steel. The carbon on the other hand results in a gaseous product in accordance with the following equation:

$$C + O = CO$$

which causes a boiling movement and the gas escapes. It is therefore apparent that the deoxidation by means of the production of gaseous CO is metallurgically much more valuable than by the production of solid deoxidation products. It has been found in accordance with the present invention that the production of gaseous CO sufficient to result in a lively boiling movement of the molten steel bath can occur only by the use of de-siliconized pig iron containing carbon.

When the steel bath in the open hearth furnace is boiled down to a carbon content of 0.1%, then the boiling movement subsides due to the lower carbon concentration. Simultaneously the FeO content of the steel bath increases, the more so as the carbon content decreases. By addition of 10 kg. of solid silicon-free pig iron per ton of steel a lively boiling movement is originated due to the great difference in concentration between the carbon content of the pig iron and the FeO content of the steel bath. This leads for about 10 minutes to reduction of the FeO content of the steel bath. The draw has to take place during this period, since thereafter the deoxidation leads to an oxidation and consequently increased decarbonization.

In case a prolonged deoxidation is desired, the pig iron addition is increased up to 20 kg. per ton of steel. In either of the two cases, however, the boiling process is not interrupted, not even for a moment, which is also desirable from the point of view of the metallurgist.

Even more important than the pre-deoxidation in the furnace is the deoxidation with silicon-free steel iron in the ladle. While in the furnace, the disturbent factor of the slag is always apparent, the contents of the ladle up to the end point of the steel tapping are without slag. Therefore all reactions can take place without being disturbed by slag.

It is also valid for the ladle that aluminum, silicon and manganese are more intensive deoxidation agents than carbon. But here also it is true that all of these, in contrast to carbon form solid deoxidation products. Steel cools during introduction into the ladle and has a tendency to give up oxygen. Since this elimination occurs in the absence of aluminum and silicon only by way of a carbon oxide, gas formation is greatly favored by the addition of silicon-free pig iron. This addition has to be made so early that the pig iron is used up when slag enters the pan. Otherwise due to the remainder of the non-dissolved steel, iron cementation takes place since the generating pressure of the carbon oxide is too small to penetrate the slag cover.

The proper de-oxidation in the ladle is of decisive importance for the correct casting in the molds. Aluminum is such a strong deoxidizing agent that additions are easily chosen too high or too low. However, upon sufficient addition of silicon-free stel iron mistakes are avoided, since the carbon in each case at any temperature adjusts the equilibrium between the steel composition and its oxygen content. With too large quantities, at most slight cementation might take place which is desirable inasmuch as thereby in any event the most favorable oxygen content for the casting is adjusted.

All soft steel melts are from a metallurgical point of view more unfavorable the hotter they are cast. In such cases larger quantities of silicon-free steel iron which are added during drawing into the pan serve to adjust the temperature, whereby the larger oxygen contents are safely disposed of due to the larger quantities of carbon.

What has been said concerning the deoxidation in the ladle of open hearth steel by the addition of silicon-free steel iron is also valid for ladle steel originating as Bessemer or Thomas steel. If the temperature permits, the added quantities may be so adapted that except for ferromanganese no other cementation agents are required.

The substantially silicon-free pig iron used in accordance with the present invention for the deoxidation of the molten steel should preferably contain at least 1% by weight of carbon and preferably at least 3% by weight of carbon. Best results have been obtained with pig irons containing between 3–4.3% by weight of carbon. The silicon content of the pig iron should be as low as possible and most preferably should be zero. In any event the pig iron should not contain more than 0.01% by weight of silicon.

The pig iron may also contain phosphorous in an amount of between 0.05–0.5% by weight and preferably 0.05% manganese in an amount of between 0.1–4% by weight and preferably 0.1%, and sulfur in an amount of between 0.015–0.6% by weight and preferably 0.015%.

The amount of pig iron used per each ton of molten steel in the bath is preferably between 5–25 kg. and most preferably between 10–20 kg. The deoxidation may be carried out in any suitable furnace, such as an open hearth furnace, or in a converter or in the ladle.

In addition to providing for the deoxidation of steel, the present invention also provides a method of producing de-siliconized pig iron for use in the deoxidation of the steel. This is accomplished according to the present invention by pre-refining a pig iron, steel iron, spiegeleisen or the like in a converter, open hearth furnace or the ladle by blowing until substantially all of the silicon is oxidized without substantially reducing the carbon content. This results in only slight reduction in the carbon content, e. g. from 4.3% to 3.5–4.2% and also some reduction in the contents of phosphorous, manganese and sulfur. The thus produced substantially silicon-free pig iron may then be directly used in the deoxidation of steel in accordance with the present invention.

The use of silicon-free pig iron in accordance with the present invention also has the advantage in that it can result in the production of steel containing up to 0.03% C. in the final product, which prior to the present invention could only be achieved with great los of time and iron by greatly enriching the steel bath with oxygen. The ferromanganese which is added subsequent to the deoxidation with the silicon-free pig iron shows a lesser melting loss than if the deoxidation had been carried out by other means.

By the addition of silicon-free pig iron to a steel mill in the open hearth furnace having about 0.1% carbon content, an immediate very lively boiling movement is caused. This is released by the great difference in concentration between the carbon in the pig iron and the increasing oxygen content of the soft steel. A reduction in the oxygen content by way of the gaseous CO occurs for as long as solid pig iron is being dissolved. Thereafter the deoxidation reverts again into an oxidation and the decarbonization advances quickly due to the turbulent mixing of steel and slag. In this way a carbon content of 0.02 to 0.03% can be achieved faster than can be done by means of ore blowing.

The preferred final carbon content of the steel bath in connection with the use of silicon-free pig iron is between 0.06 and 0.08%.

The highest final carbon content of steel which is treated with silicon-free steel iron should preferably not exceed 0.12% carbon.

Most soft steel required during casting into the ladle an addition of ferromanganese. The ferromanganese is added for alloying, also for the deoxidation of the steel. In the sequence of addition to the ladle according to the present invention, first the silicon-free pig iron is added and only after this, the ferromanganese. The carbon of the silicon-free pig iron withdraws part of the oxygen as CO so that therefore the later added ferromanganese is used to a lesser degree for deoxidation and therefore acts more strongly as an alloying material, in other words the manganese added to the steel gives a better yield when previously silicon-free pig iron has been added.

The present invention will be further illustrated by the following examples, the scope of the invention not however being limited to the specific details of the examples.

*Example 1*

This example illustrates the de-siliconizing of a pig iron.

A converter is charged with a pig iron having the following composition:

| | Percent |
|---|---|
| C | 4.3 |
| P | 0.2 |
| Mn | 3.0 |
| Si | 0.8 |
| S | 0.04 |
| Fe | Balance | at 1200° C. and with 15 kg. of lime per ton of pig iron. The lime which only partially goes into solution serves to bind the silicic acid. To the greatest extent the formed slag consists of manganese silicates as a result of the burning of the manganese and the silicon. The mixture is blown until the pale carbon flame indicates the complete oxidation of the silicon. Duration: 4 minutes; final temperature: 1350° C.

The resulting de-siliconized pig iron has the following composition:

| | Percent |
|---|---|
| C | 3.6 |
| P | 0.18 |
| Mn | 1.5 |
| Si | Less than 0.01 |
| S | 0.020 |
| Fe | Balance |

The carbon is burned off to about 3.6%. Only very little phosphorous is burned off. The manganese oxidizes to about one-half the original, namely to 1.5%, and the same with sulfur which is reduced to about 0.02%. The silicon with less than 3.6% C is completely oxidized. The iron is emptied into a ladle with holding back of the slag and is then poured into pigs. With a pig iron containing more than 0.8% silicon it is necessary to add scrap or mill scale for cooling purposes, and indeed it is necessary to add 500 kg. of scrap iron or 250 kg. of mill scale per each ton of pig iron and each 0.1% silicon.

*Example 2*

A pig iron having the following composition:

| | Percent |
|---|---|
| C | 4.2 |
| P | 0.2 |
| Mn | 1.5 |
| Si | 0.5 |
| S | 0.035 |
| Fe | Balance | is blown in the converter to de-siliconize the same utilizing 12 kg. of lime per ton of pig iron, the blowing time being only about 3 minutes. The blowing is continued until the pale carbon flame indicates de-siliconization and then the molten iron is emptied into a ladle. The de-siliconized iron has the following composition:

| | Percent |
|---|---|
| C | 3.5 |
| P | 0.18 |
| Mn | 0.8 |
| Si | Less than 0.01 |
| S | 0.018 |
| Fe | Balance |

Only a small amount of the carbon is burned off, the silicon is burned off almost completely until only traces remain and the manganese and sulfur contents are reduced about 50%. The final temperature is 1350° C.

*Example 3*

An open hearth furnace is charged with cold pig iron and 1.0% lime. The composition of the charged cold pig iron is as follows:

| | Percent |
|---|---|
| C | 4.3 |
| P | 0.2 |
| Mn | 3.0 |
| Si | 0.8 |
| S | 0.035 |
| Fe | Balance |

The charge is melted and after the whole is liquid, ore is added corresponding to the silicon content of the pig iron in order to oxidize the silicon. With an ore containing 50% $Fe_2O_3$ at least 10 kg. of ore per ton of pig iron and per each 0.1% silicon is added since the carbon and the manganese also require oxygen. The complete oxidation of the silicon is determined after 30 minutes of cooking time by analysis. The de-siliconized pig iron is emptied into a ladle and poured into pigs. The analysis of the resulting pig iron for the open hearth furnace is as follows:

| | Percent |
|---|---|
| C | 3.8 |
| P | 0.16 |
| Mn | 1.5 |
| Si | Less than 0.01 |
| S | Less than 0.03 |
| Fe | Balance |

The final temperature is 1350° C.

*Example 4*

An open hearth furnace is charged with molten pig iron at 1250° C. and with 1% of lime and after a short heating 10 kg. of ore per ton of pig iron and each 0.1% silicon is added. After the oxidation of the silicon, which is determined by analysis, the de-siliconized pig iron is emptied into a ladle and poured into pigs. The end temperature is 1350° C.

The composition of the pig iron introduced into the open hearth furnace is as follows:

| | Percent |
|---|---|
| C | 4.2 |
| P | 0.2 |
| Mn | 2.0 |
| Si | 0.5 |
| S | 0.030 |
| Fe | Balance |

The analysis of the tapped metal after de-siliconization in the open hearth furnace is as follows:

| | Percent |
|---|---|
| C | 3.7 |
| P | 0.16 |
| Mn | 0.8 |
| Si | Less than 0.01 |
| S | 0.025 |
| Fe | Balance |

*Example 5*

Pig iron in a ladle and having the following analysis:

| | Percent |
|---|---|
| C | 4.3 |
| P | 0.2 |
| Mn | 3.0 |
| Si | 0.8 |
| S | 0.04 |
| Fe | Balance | is refined by blowing therethrough 20 m.³ of pure oxygen per ton of pig iron until the silicon is oxidized. The blowing time is 30 minutes. Either 2% of mill scale or 5% scrap is added as cooling means. The starting temperature is 1200° C. and the final temperature is 1320° C. If mill scale is utilized the oxygen requirement is only about 18 m.³ per ton of pig iron. The resulting de-siliconized pig iron has the following composition:

| | Percent |
|---|---|
| C | 3.6 |
| P | 0.1 |
| Mn | 1.5 |
| Si | Less than 0.01 |
| S | 0.025 |
| Fe | Balance |

*Example 6*

Pig iron in a ladle and having the following composition:

| | Percent |
|---|---|
| C | 4.3 |
| P | 0.2 |
| Mn | 1.5 |
| Si | 0.8 |
| S | 0.035 |
| Fe | Balance | is refined by blowing through 20 m.³ of oxygen per ton of pig iron until the silicon is oxidized. The blowing time is 30 minutes. The starting temperature is 1220° C. and the final temperature is 1300° C. The analysis of the de-siliconized pig iron shows the following composition:

| | Percent |
|---|---|
| C | 4.0 |
| P | 0.14 |
| Mn | 0.8 |
| Si | Less than 0.01 |
| S | 0.025 |
| Fe | Balance |

Because of the lower temperature by blowing oxygen in, the de-carbonizing and the removal of phosphorous is somewhat less than with blowing.

*Example 7*

After turning the Thomas or Bessemer converter on its side which is done after completion of the blow, 10 kg. of solid red hot de-siliconized pig iron produced according to Example 1 and having the composition thereof is introduced into the converter per each ton of steel therein. The steel in the converter before introduction of the de-siliconized pig iron contains 0.35% by weight of FeO. The addition of the de-siliconized pig iron causes a lively boiling movement which results in a deoxidation of the steel without however any recarburizing or re-phosphorization. The reaction time is about 5 minutes, the temperature about 1600° C. and the resulting steel has a carbon content of about 0.03% and is substantially oxygen-free.

*Example 8*

This example is carried out as Example 7 utilizing however 20 kg. of de-siliconized pig iron produced according to Example 2 per each ton of molten steel, the steel containing about 0.65% by weight of FeO. The reaction time is about 10 minutes and the resulting deoxidized steel contains about 0.01% by weight of carbon.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a method of producing steel, the deoxidation of the steel comprising the step of contacting molten steel containing oxygen with a pig iron containing carbon and containing a maximum of 0.01% by weight of silicon, whereby said molten steel is deoxidized by reaction of the oxygen contained therein with the carbon of said pig iron producing gas which agitates the mixture and thereby results in rapid and homogeneous deoxidation of said steel.

2. In a method of producing steel, the deoxidation of the steel comprising the step of contacting molten steel containing between 0.35% and 0.65% by weight of FeO with a pig iron containing at least 1% by weight of carbon and containing a maximum of 0.01% by weight of silicon, whereby said molten steel is deoxidized by reaction of the oxygen contained therein with the carbon of said pig iron producing gas which agitates the mixture and thereby results in rapid and homogeneous deoxidation of said steel.

3. In a method of producing steel, the deoxidation of the steel comprising the step of contacting molten steel containing between 0.35% and 0.65% by weight of FeO with a pig iron containing at least 3% by weight of carbon and containing a maximum of 0.01% by weight of silicon, whereby said molten steel is deoxidized by reaction of the oxygen contained therein with the carbon of said pig iron producing gas which agitates the mixture and thereby results in rapid and homogeneous deoxidation of said steel.

4. In a method of producing steel, the deoxidation of the steel comprising the step of contacting molten steel containing between 0.35% and 0.65% by weight of FeO with a pig iron containing at least 3% by weight of carbon and containing a maximum of 0.01% by weight of silicon, whereby said molten steel is deoxidized by reaction of the oxygen contained therein with the carbon of said pig iron producing gas which agitates the mixture and thereby results in rapid and homogeneous deoxidation of said steel.

5. In a method of producing steel, the deoxidation of the steel comprising the step of contacting molten steel containing between 0.35% and 0.65% by weight of FeO with a pig iron containing between 1–4.3% by weight of carbon, between 0.005–0.5% by weight of phosphorous, between 0.1–4.0% by weight of manganese, between 0.015–0.6% by weight of sulfur and containing a maximum of 0.01% by weight of silicon, whereby said molten steel is deoxidized by reaction of the oxygen contained therein with the carbon of said pig iron producing gas which agitates the mixture and thereby results in rapid and homogeneous deoxidation of said steel.

6. In a method of producing steel, the deoxidation of the steel comprising the step of contacting in an open hearth furnace molten steel containing between 0.35% and 0.65% by weight of FeO with a pig iron containing carbon and containing a maximum of 0.01% by weight of silicon, whereby said molten steel is deoxidized by reaction of the oxygen contained therein with the carbon of said pig iron producing gas which agitates the mixture and thereby results in rapid and homogeneous deoxidation of said steel.

7. In a method of producing steel, the deoxidation of the steel comprising the step of contacting in a converter molten steel containing between 0.35% and 0.65% by weight of FeO with a pig iron containing carbon and containing a maximum of 0.01% by weight of silicon, whereby said molten steel is deoxidized by reaction of the oxygen contained therein with the carbon of said pig iron producing gas which agitates the mixture and thereby results in rapid and homogeneous deoxidation of said steel.

8. In a method of producing steel, the deoxidation of the steel comprising the step of contacting in a ladle molten steel containing between 0.35% and 0.65% by weight of FeO with a pig iron containing carbon and containing a maximum of 0.01% by weight of silicon, whereby said molten steel is deoxidized by reaction of the oxygen contained therein with the carbon of said pig iron producing gas which agitates the mixture and thereby results in rapid and homogeneous deoxidation of said steel.

9. In a method of producing steel, the deoxidation of the steel comprising the step of contacting molten steel containing between 0.35% and 0.65% by weight of FeO with a pig iron containing carbon and containing a maximum of 0.01% by weight of silicon in an amount of 5–25 kg. of said pig iron per each ton of said steel, whereby said molten steel is deoxidized by reaction of the oxygen contained therein with the carbon of said pig iron producing gas which agitates the mixture and thereby results in rapid and homogeneous deoxidation of said steel.

10. In a method of producing steel, the deoxidation of the steel comprising the step of contacting molten steel containing between 0.35% and 0.65% by weight of FeO with a pig iron containing carbon and containing a maximum of 0.01% by weight of silicon in an amount of 10–20 kg. of said pig iron per each ton of said steel, whereby said molten steel is deoxidized by reaction of the oxygen contained therein with the carbon of said pig iron producing gas which agitates the mixture and thereby results in rapid and homogeneous deoxidation of said steel.

References Cited in the file of this patent

UNITED STATES PATENTS

| | | |
|---|---|---|
| 1,466,301 | Jones | Aug. 28, 1923 |
| 1,666,428 | Stobrawa | Apr. 17, 1928 |
| 2,390,346 | Boyer et al. | Dec. 4, 1945 |

FOREIGN PATENTS

| | | |
|---|---|---|
| 2,673 | Great Britain | Oct. 17, 1891 |

OTHER REFERENCES

"A Study of Modern Bessemer Steels" (McGinley et al.), published by Carnegie-Illinois Steel Corp. (Youngstown District), 1941. (Page 7 relied on. Copy in Sci. Libr. and Div. 3.)